US007098265B2

United States Patent
Qian et al.

(10) Patent No.: US 7,098,265 B2
(45) Date of Patent: Aug. 29, 2006

(54) LIQUID INKS COMPRISING A STABLE ORGANOSOL

(75) Inventors: Julie Yu Qian, Woodbury, MN (US); James A. Baker, Hudson, WI (US)

(73) Assignee: Samsung Electronics Co., Ltd., Suwon (KR)

( * ) Notice: Subject to any disclaimer, the term of this patent is extended or adjusted under 35 U.S.C. 154(b) by 472 days.

(21) Appl. No.: 10/013,791

(22) Filed: Dec. 10, 2001

(65) Prior Publication Data

US 2002/0128349 A1 Sep. 12, 2002

Related U.S. Application Data

(60) Provisional application No. 60/258,784, filed on Dec. 29, 2000.

(51) Int. Cl.
*C08L 51/00* (2006.01)
*C08L 33/10* (2006.01)
*C09D 11/10* (2006.01)

(52) U.S. Cl. ........................ 524/504; 524/523; 523/160
(58) Field of Classification Search ................. 523/160, 523/161, 201, 206; 524/504, 516, 523; 106/31.57, 106/31.85
See application file for complete search history.

(56) References Cited

U.S. PATENT DOCUMENTS

| 3,772,053 A | 11/1973 | Eastman et al. ............... 117/37 |
| 4,229,513 A | 10/1980 | Merrill et al. ............... 430/115 |
| 4,476,210 A | 10/1984 | Croucher et al. ............ 430/114 |
| 4,547,449 A | 10/1985 | Alexandrovich et al. ... 430/115 |
| 4,925,766 A * | 5/1990 | Elmasry et al. ............. 430/115 |
| 4,978,598 A | 12/1990 | Elmasry et al. ............. 430/137 |
| 5,106,717 A | 4/1992 | Houle et al. ................. 430/114 |
| 5,112,718 A | 5/1992 | Kato et al. ................... 430/114 |
| 5,342,725 A | 8/1994 | Kato ........................... 430/115 |
| 5,482,809 A | 1/1996 | Rao et al. .................... 430/114 |
| 5,484,679 A | 1/1996 | Spiewak et al. ............. 430/115 |
| 5,525,448 A | 6/1996 | Larson et al. ................ 430/115 |
| 5,532,099 A | 7/1996 | Horie et al. ................. 430/115 |
| 5,573,882 A | 11/1996 | Larson et al. ............... 430/115 |
| 5,604,070 A | 2/1997 | Rao et al. .................... 430/110 |
| 5,652,282 A | 7/1997 | Baker et al. ................. 523/201 |
| 5,698,616 A | 12/1997 | Baker et al. ................. 523/201 |
| 5,763,528 A * | 6/1998 | Barsotti et al. ............... 525/63 |
| 5,886,067 A | 3/1999 | Li et al. ...................... 523/201 |
| 6,103,781 A | 8/2000 | Li et al. ...................... 523/201 |
| 6,255,363 B1 | 7/2001 | Baker et al. ................. 523/201 |
| 2002/0086916 A1 * | 7/2002 | Morrison et al. ........... 523/160 |

FOREIGN PATENT DOCUMENTS

| WO | WO 97/12284 | 4/1997 |
| WO | WO 98/13731 | 4/1998 |

* cited by examiner

*Primary Examiner*—Callie Shosho
(74) *Attorney, Agent, or Firm*—Mark A. Litman and Associates, P.A.

(57) ABSTRACT

A liquid ink comprises (a) a carrier liquid having a Kauri-Butanol number less than 30; (b) a graft copolymer comprising a (co)polymeric steric stabilizer covalently bonded to a thermoplastic (co)polymeric core that is insoluble in the carrier liquid; and (c) a colorant, wherein the steric stabilizer comprises units derived from 3,3,5-trimethylcyclohexyl methacrylate, and the thermoplastic (co)polymeric core comprising units derived from at least a polymerizable monomer selected from the group consisting of (meth) acrylates having aliphatic amino radicals, nitrogen-containing heterocyclic vinyl monomers, N-vinyl substituted ring-like amide monomers, aromatic substituted ethylene monomers containing amino radicals, and nitrogen-containing vinylether monomers. The organosol provides improved liquid electrophotographic and electrographic ink compositions with improved dispersion stability, chargeability, and blocking resistance so that improved print quality or ink transfer performance are obtained.

8 Claims, No Drawings

LIQUID INKS COMPRISING A STABLE ORGANOSOL

RELATED APPLICATIONS

This application claims priority from provisional U.S. Application Serial No. 60/258,784 filed on Dec. 29, 2000.

BACKGROUND OF THE INVENTION

1. Field of the Invention

This invention relates to liquid ink compositions, and particularly to liquid ink compositions that are useful in printing processes. In particular, this invention relates to a liquid ink which exhibits improved dispersion stability, improved blocking resistance, and improved chargeability when used in any imaging process, including but not limited to ink transfer processes, ionographic, ink jet, bubble jet, electrographic and electrophotographic color printing or proofing processes.

2. Background of the Art

Liquid inks are widely used in a variety of imaging and printing processes, for example offset, bubble jet, ink jet, intaglio, rotogravure, electrographic, and electrophotographic printing. Many characteristics that are desired in pigment dispersions for liquid inks are the same for each of the respective processes, even though the final ink formulations and process of application may be substantially different. For example, the stability of the pigment dispersion on the shelf, under shear conditions, and under high voltage fields is an important consideration regardless of the final use of the liquid ink. The art continuously searches for more stable pigment dispersions to provide more flexibility in ink formulations to provide better efficiency and waste reduction in the various printing processes.

In electrophotographic applications, which includes devices such as photocopiers, laser printers, facsimile machines and the like, liquid inks also are referred to as liquid toners or developers. Generally, the electrophotographic process includes the steps of forming a latent electrostatic image on a charged photoconductor by exposing the photoconductor to radiation in an imagewise pattern, developing a temporary image on the photoconductor by contacting the photoconductor with a liquid developer, and finally transferring the temporary image to a receptor. The final transfer step may be performed either directly from the photoconductor or indirectly through an intermediate transport member. The developed image is usually subjected to heat and/or pressure to permanently fuse the image to the receptor.

Liquid toners typically comprise an electrically insulating liquid that serves as a carrier for a dispersion of charged particles, known as toner particles. These toner particles are composed of at least a colorant (e.g., pigment or dye) and a polymeric binder. A charge control agent is often included as a component of the liquid developer to regulate the polarity and magnitude of the charge on the toner particles. Liquid toners can be categorized into two primary classes. For convenience, the two classes will be referred to as conventional liquid toners and organosol toners. Between these two classes of liquid toners, organosol toners are preferred in electrophotograph applications for their stability.

Stable organosols contain colloidal (approximately 0.1–1 micron diameter) particles of polymeric binder. The organosol particles are typically synthesized by nonaqueous dispersion polymerization in a low dielectric hydrocarbon solvent. These organosol particles are sterically-stabilized with respect to aggregation by the use of a physically-adsorbed or chemically-grafted soluble polymer. Details of the mechanism of such steric stabilization are provided in Napper, D. H., *Polymeric Stabilization of Colloidal Dispersions*, Academic Press, New York, N.Y., 1983. Procedures for effecting the synthesis of self-stable organosols are known to those skilled in the art and are described in *Dispersion Polymerization in Organic Media*, K. E. J. Barrett, ed., John Wiley: New York, N.Y., 1975.

The most commonly used non-aqueous dispersion polymerization method is a free radical polymerization carried out when one or more ethylenically-unsaturated (typically acrylic or methacrylic) monomers, soluble in a hydrocarbon medium, are polymerized in the presence of a preformed amphipathic polymer. The preformed amphipathic polymer, commonly referred to as the stabilizer, is comprised of two distinct units, one essentially insoluble in the hydrocarbon medium, the other freely soluble. When the polymerization process to manufacture the organosol particle proceeds to a fractional conversion of monomer corresponding to a critical molecular weight, the solubility limit of the polymer is exceeded and the polymer precipitates from solution, forming a "core" particle. The amphipathic polymer then either adsorbs onto, ionically bonds to or covalently bonds to the core, which core continues to grow as a discrete particle. The particles continue to grow until monomer is depleted, and the attached amphipathic polymer "shell" acts to sterically-stabilize the growing core particles with respect to aggregation. The resulting non-aqueous colloidal dispersion (organosol) comprises core/shell polymer particles with a number average diameter in the range of about 0.05–5 microns.

The resulting organosols can be subsequently converted to liquid toners by simple incorporation or mixing of the colorant (pigment) and a charge director, followed by high shear homogenization, ball-milling, attritor milling, high energy bead (sand) milling or other size reduction processes or mixing means known in the art for effecting particle size reduction in forming a dispersion. The input of mechanical energy to the dispersion during milling acts to break down pigment agglomerates into primary particles (e.g., from about 0.05–1.0 micron number average diameter) and to "shred" the organosol into fragments that adhere to the newly-created pigment surface, thereby acting to sterically-stabilize the pigment particles with respect to aggregation. The charge director may physically or chemically adsorb onto the pigment, the organosol or both. The result is a sterically-stabilized, charged, non-aqueous pigment dispersion having particles in the size range of about 0.05–5.0 microns number average diameter, with typical toner particle number average diameters between about 0.15–1.0 microns. Such a sterically-stabllized dispersion is ideally suited for use in high resolution printing.

A problem in formulating liquid inks is the tack of the image on the final receptor. If the image has a residual tack, then the image may become embossed or picked off when placed in contact with another surface. This phenomenon is called blocking. This is especially a problem when printed sheets are placed in a stack, as when printed sheets are fed out of a printer into a collector. If the image is tacky, it may adhere or transfer portions of the image to the backside of the adjacent sheet. To address this concern, a film laminate or protective layer is typically placed over the surface of the image. This adds both an extra cost of materials and extra process steps to apply the protective layer.

Another problem in formulating rapid self-fixing liquid inks is the difficulty in obtaining liquid inks that have both excellent aggregation stability and sedimentation stability on the shelf It is known in the art that film-forming liquid inks comprising stable organosols generally exhibit either excellent aggregation stability or sedimentation stability, but not necessarily both. The aggregation stability of an organosol is related to the tendency of the core/shell particles to aggregate into effectively larger groups of particles. The sedimentation stability of an organosol is related to the tendency of the components, especially the colorant particles, of the organosol to settle out of the dispersion or suspension. Hence, there is a need for liquid ink compositions having both excellent aggregation stability and sedimentation stability.

An important consideration in formulating liquid inks is the chargeability of the liquid ink. It is desirable for a liquid ink to have a high chargeability so that it can acquire enough quantity of charge to be forced under an electrical field to migrate and then to plate upon the imaged areas on the photoreceptor with differentiation based upon charge differences on the photoreceptor. The chargeability of a liquid ink is measured by its conductivity and its mobility. In general, liquid inks with a high ink conductivity and a high ink mobility are desirable.

This invention provides a stable organosol with a novel composition that exhibits increased dispersion stability, improved blocking resistance, and improved chargeability.

SUMMARY OF THE INVENTION

In a first aspect, the invention features an organosol dispersion that includes:

(a) a carrier liquid having a Kauri-Butanol number less than 30; and (b) a graft copolymer comprising a (co)polymeric steric stabilizer covalently bonded to a thermoplastic (co)polymeric core that is insoluble in the carrier liquid, wherein the thermoplastic (co)polymeric core comprises a (co)polymer having units derived from at least a polymerizable monomer selected from the group consisting of 1) (meth)acrylates having aliphatic amino radicals, 2) nitrogen-containing heterocyclic vinyl monomers, 3) N-vinyl substituted ring-like amide monomers, 4) aromatic substituted ethylene monomers containing amino radicals, and 5) nitrogen-containing vinylether monomers.

In a second aspect, the invention describes an organosol dispersion that includes:

(a) a carrier liquid having a Kauri-Butanol number less than 30; and (b) a graft copolymer comprising a (co)polymeric steric stabilizer covalently bonded to a thermoplastic (co)polymeric core that is insoluble in the carrier liquid, wherein the steric stabilizer comprises a polymer having units derived from 3,3,5-trimethylcyclohexyl methacrylate.

In a third aspect, the invention features an organosol dispersion that includes:

(a) a carrier liquid having a Kauri-Butanol number less than 30; and (b) a graft copolymer comprising a (co)polymeric steric stabilizer covalently bonded to a thermoplastic (co)polymeric core that is insoluble in the carrier liquid, wherein the steric stabilizer comprises a polymer comprising units derived from 3,3,5-trimethylcyclohexyl methacrylate, and the thermoplastic (co)polymeric core comprising units derived from at least a polymerizable monomer selected from the group consisting of 1) (meth)acrylates having aliphatic amino radicals, 2) nitrogen-containing heterocyclic vinyl monomers, 3) N-vinyl substituted ring-like amide monomers, 4) aromatic substituted ethylene monomers containing amino radicals, and 5) nitrogen-containing vinylether monomers.

In a fourth aspect, the invention features a liquid ink that includes:

(b) a carrier liquid having a Kauri-Butanol number less than 30;

(b) a graft copolymer comprising a (co)polymeric steric stabilizer covalently bonded to the thermoplastic (co)polymeric core that is insoluble in the carrier liquid; and (c) a colorant, wherein the thermoplastic (co)polymeric core comprises a (co)polymer having units derived from at least a polymerizable monomer selected from the group consisting of 1) (meth)acrylates having aliphatic amino radicals, 2) nitrogen-containing heterocyclic vinyl monomers, 3) N-vinyl substituted ring-like amide monomers, 4) aromatic substituted ethylene monomers containing amino radicals, and 5) nitrogen-containing vinylether monomers.

In a fifth aspect, the invention features a liquid ink that includes:

(a) a carrier liquid having a Kauri-Butanol number less than 30;

(b) a graft copolymer comprising a (co)polymeric steric stabilizer covalently bonded to a thermoplastic (co)polymeric core that is insoluble in the carrier liquid; and (c) a colorant, wherein the steric stabilizer comprises a polymer having units derived from 3,3,5-trimethylcyclohexyl methacrylate.

In a sixth aspect, the invention features a liquid ink that includes:

(a) a carrier liquid having a Kauri-Butanol number less than 30;

(b) a graft copolymer comprising a (co)polymeric steric stabilizer covalently bonded to a thermoplastic (co)polymeric core that is insoluble in the carrier liquid; and (c) a colorant, wherein the steric stabilizer comprises a polymer comprising units derived from 3,3,5-trimethylcyclohexyl methacrylate, and the thermoplastic (co)polymeric core comprising units derived from at least a polymerizable monomer selected from the group consisting of 1) (meth)acrylates having aliphatic amino radicals, 2) nitrogen-containing heterocyclic vinyl monomers, 3) N-vinyl substituted ring-like amide monomers, 4) aromatic substituted ethylene monomers containing amino radicals, and 5) nitrogen-containing vinylether monomers.

The liquid inks of the present invention will be described primarily with respect to electrophotographic office printing; however, it is to be understood that these liquid toners are not so limited in their utility and may also be employed in other imaging processes, other printing processes, or other ink transfer processes, such as high speed printing presses, photocopying apparatus, microfilm reproduction devices, facsimile printing, ink jet printer, instrument recording devices, and the like.

DETAILED DESCRIPTION OF THE INVENTION

A liquid ink composition is provided comprising a colorant and an organosol dispersed in a liquid having a Kauri-Butanol (KB) number less than 30. The liquid ink composition is resistant to both aggregation and sedimentation and is capable of rapid film formation (rapid self-fixing), which is particularly useful in electrophotographic, ionographic or electrostatic imaging and other conventional printing processes. "Kauri-Butanol" refers to an ASTM Test Method D1133–54T. The Kauri-Butanol Number (KB) is a measure of the tolerance of a standard solution of kauri resin in 1-butanol to an added hydrocarbon diluent and is measured as the volume in milliliters (mL) at 25° C. of the solvent required to produce a certain defined degree of turbidity when added to 20 g of a standard kauri-1-butanol solution. Standard values are toluene (KB=105) and 75% by volume of heptane with 25% by volume toluene (KB=40).

The polymer particle in the organosol of the present invention is an amphipathic copolymer. The amphipathic copolymer comprises a soluble or marginally insoluble high molecular weight (co)polymeric steric stabilizer covalently bonded to an insoluble, thermoplastic (co)polymeric core. Superior stability of the dispersed toner particles with respect to aggregation and sedimentation is particularly obtained when the stabilizer contains 3,3,5-trimethylcyclohexyl methacrylate.

Table 1 lists the Kauri-Butanol Number and Hildebrand solubility parameter for some common carrier liquids used in electrophotographic toners and Table 2 lists the Hildebrand solubility parameter and glass transition Temperature of common monomers.

TABLE 1

Solvent Values at 25° C.

| Solvent Name | Kauri-Butanol Number by ASTM Method D1133-54T (mL) | Hildebrand Solubility Parameter (MPa$^{1/2}$) |
| --- | --- | --- |
| Norpar ™ 15 | 18 | 13.99 |
| Norpar ™ 13 | 22 | 14.24 |
| Norpar ™ 12 | 23 | 14.30 |
| Isopar ™ V | 25 | 14.42 |
| Exxsol ™ D80 | 28 | 14.60 |

Source: Calculated from equation #31 of Polymer Handbook, 3rd Ed., J. Brandrup E. H. Immergut, Eds. John Wiley, NY, p. VII/522 (1989).

TABLE 2

Monomer Values at 25° C.

| Monomer Name | Hildebrand Solubility Parameter (MPa$^{1/2}$) | Glass Transition Temperature (° C.)* |
| --- | --- | --- |
| n-Octadecyl Methacrylate | 16.77 | −100 |
| n-Octadecyl Acrylate | 16.82 | −55 |
| Lauryl Methacrylate | 16.84 | −65 |
| Lauryl Acrylate | 16.95 | −30 |
| 2-Ethylhexyl Methacrylate | 16.97 | −10 |
| 2-Ethylhexyl Acrylate | 17.03 | −55 |
| n-Hexyl Methacrylate | 17.13 | −5 |
| t-Butyl Methacrylate | 17.16 | 107 |
| n-Butyl Methacrylate | 17.22 | 20 |
| n-Hexyl Acrylate | 17.30 | −60 |
| n-Butyl Acrylate | 17.45 | −55 |
| Ethyl Methacrylate | 17.90 | 66 |
| Ethyl Acrylate | 18.04 | −24 |

TABLE 2-continued

Monomer Values at 25° C.

| Monomer Name | Hildebrand Solubility Parameter (MPa$^{1/2}$) | Glass Transition Temperature (° C.)* |
| --- | --- | --- |
| Methyl Methacrylate | 18.17 | 105 |
| Vinyl Acetate | 19.40 | 30 |
| Methyl Acrylate | 20.2 | 5 |

Calculated using Small's Group Contribution Method, Small, P.A. Journal of Applied Chemistry 3 p. 71 (1953). Using Group Contributions from Polymer Handbook, 3rd Ed., J. Brandrup E. H. Immergut, Eds., John Wiley, NY, p. VII/525 (1989).
*Polymer Handbook, 3rd Ed., J. Brandrup E. H. Immergut, Eds., John Wiley, NY, pp. VII/209–277 (1989).

The carrier liquid may be selected from a wide variety of materials that are known in the art, but the carrier liquid preferably has a Kauri-Butanol number less than 30. The liquid is typically oleophilic, chemically stable under a variety of conditions, and electrically insulating. Electrically insulating refers to a liquid having a low dielectric constant and a high electrical resistivity. Preferably, the liquid has a dielectric constant of less than 5, more preferably less than 3. Electrical resistivities of carrier liquids are typically greater than $10^9$ Ohm-cm, more preferably greater than $10^{10}$ Ohm-cm. The carrier liquid preferably is also relatively nonviscous to allow movement of the charged particles during development, and sufficiently volatile to permit its timely removal from the final imaged substrate, but sufficiently non-volatile to minimize evaporative losses in the stored developer. In addition, the carrier liquid should be chemically inert with respect to the materials or equipment used in the liquid electrophotographic process, particularly the photoreceptor and its release surface.

Non-limiting examples of suitable carrier liquids include aliphatic hydrocarbons (n-pentane, hexane, heptane and the like), cycloaliphatic hydrocarbons (cyclopentane, cyclohexane and the like), aromatic hydrocarbons (benzene, toluene, xylene and the like), halogenated hydrocarbon solvents (chlorinated alkanes, fluorinated alkanes, chlorofluorocarbons, and the like), silicone oils and blends of these solvents. Preferred carrier liquids include branched paraffinic solvent blends such as Isopar™ G, Isopar™ H, Isopar™ K, Isopar™ L, Isopar™ M and Isopar™ V (available from Exxon Corporation, NJ), and most preferred carriers are the aliphatic hydrocarbon solvent blends such as Norpar™ 12, Norpar™ 13 and Norpar™ 15 (available from Exxon Corporation, NJ).

The composition of the graft stabilizer is normally selected such that the Hildebrand Solubility Parameter of the graft stabilizer (shell) closely matches that of the carrier liquid to ensure that the stabilizer will be sufficiently solvated to dissolve in the carrier solvent. Virtually any polymerizable compound that exhibits a Hildebrand Solubility Parameter difference less than 3.0 MPa$^{1/2}$ relative to the carrier liquid may be used in forming a graft stabilizer. In addition, polymerizable compounds that exhibit a Hildebrand Solubility Parameter difference greater than 3.0 MPa$^{1/2}$ relative to the carrier liquid may be used in forming a copolymeric graft stabilizer, provided that the effective Hildebrand Solubility Parameter difference between the stabilizer and the carrier liquid is less than 3.0 MPa$^{1/2}$. The absolute difference in Hildebrand Solubility Parameter between the graft stabilizer (shell) and the carrier liquid is preferably less than 2.6 MPa$^{1/2}$.

In general, graft stabilizers derived from $C_6$–$C_{30}$ acrylates and methacrylates, such as lauryl methacrylate (LMA) and octadecyl acrylate (ODA), are very soluble in hydrocarbon carriers because their Hildebrand Solubility Parameters are close to those of hydrocarbon carriers. However, graft stabilizers derived completely from $C_6$–$C_{30}$ acrylates and methacrylates have such low Tg's that they are useless for commercial liquid inks because of their tackiness and poor blocking resistance. Nonetheless, if such graft stabilizers are modified by copolymerization with 3,3,5-trimethylcyclohexyl methacrylate (TCHMA), their tackiness and hence their blocking resistance can be improved significantly. The homopolymer of 3,3,5-trimethylcyclohexyl methacrylate (TCHMA) has a high Tg at 125° C., yet is soluble in many common carrier liquids. By co-polymerizing TCHMA with at least one $C_6$–$C_{30}$ acrylate and/or methacrylate to form graft stabilizers, the Tg's of such graft stabilizers will increase while their solubilities in carrier liquid are not adversely affected. To yield good offset transfer efficiency and excellent blocking resistance of the transferred image, a graft stabilizer having a Tg between −10° C. and 30° C. is preferred, more preferably between −5° C. and 15° C.

Non-limiting examples of suitable $C_6$–$C_{30}$ acrylic and methacrylic esters for use in the graft stabilizer composition include hexyl acrylate, 2-ethylhexyl acrylate, decyl acrylate, dodecyl (lauryl) acrylate, octadecyl (stearyl) acrylate, behenyl acrylate, hexyl methacrylate, 2-ethylhexyl (methacrylate), decyl acrylate, dodecyl (lauryl) methacrylate, octadecyl (stearyl) methacrylate, isobornyl acrylate, isobornyl methacrylate, and other acrylates and methacrylates which meet the solubility parameter requirements described above.

The graft stabilizer may be chemically bonded to the resin core (i.e., grafted to the core) or may be adsorbed onto the core such that it remains as a physically bound integral part of the resin core. Any number of reactions known to those skilled in the art may be used to effect grafting of the soluble polymeric stabilizer to the organosol core during free radical polymerization. Common grafting methods include random grafting of polyfunctional free radicals; ring-opening polymerizations of cyclic ethers, esters, amides or acetals; epoxidations; reactions of hydroxyl or amino chain transfer agents with terminally-unsaturated end groups; esterification reactions (i.e., glycidyl methacrylate undergoes tertiary-amine catalyzed esterification with methacrylic acid); and condensation reactions or polymerization. Preferred weight average molecular weights of the graft stabilizer are from 50,000 to 1,000,000 Daltons (Da), more preferably from 100,000 to 500,00 Da, most preferably from 100,000 to 300,000 Da.

The polydispersity of the graft stabilizer also has an affect on imaging and transfer performance of the liquid toners. Generally, it is desirable to maintain the polydispersity (the ratio of the weight-average molecular weight to the number average molecular weight) of the graft stabilizer below 15, more preferably below 5, most preferably below 2.5.

An additional feature of the present invention is the novel grafting site used to covalently bond the stabilizer to the insoluble core. The grafting site is formed by incorporating hydroxyl groups into the graft stabilizer during a first free radical polymerization and catalytically reacting all or a portion of these hydroxyl groups with an ethylenically unsaturated aliphatic isocyanate (e.g., meta-isopropenyldimethylbenzyl isocyanate [TMI] or 2-cyanatoethylmethacrylate [IEM] to form a polyurethane linkage during a subsequent non-free radical reaction step. The graft stabilizer is then covalently bonded to the nascent insoluble acrylic (co)polymer core via reaction of the unsaturated vinyl group of the grafting site with ethylenically-unsaturated core monomers (e.g. vinyl esters, particularly acrylic and methacrylic esters with carbon numbers less than 7 or vinyl acetate; vinyl aromatics, such as styrene; acrylonitrile; n-vinyl pyrrolidone; vinyl chloride and vinylidene chloride) during a subsequent free radical polymerization step.

Other methods of effecting grafting of the preformed polymeric stabilizer to the incipient insoluble core particle are known to those skilled in the art. For example, alternative grafting protocols are described in sections 3.7–3.8 of Barrett *Dispersion Polymerization in Organic Media*, K. E. J. Barrett, ed., (John Wiley: New York, 1975), pp. 79–106. A particularly useful method for grafting the polymeric stabilizer to core utilizes an anchoring group. The function of the anchoring groups is to provide a covalent link between the core part of the particle and the soluble component of the steric stabilizer. Suitable monomers containing anchoring groups include: adducts of alkenylazlactone comonomers with an unsaturated nucleophile containing hydroxy, amino, or mercaptan groups, such as 2-hydroxyethylmethacrylate, 3-hydroxypropylmethacrylate, 2-hydroxyethylacrylate, pentaerythritol triacrylate, 4-hydroxybutyvinylether, 9-octadecen-1-ol, cinnamyl alcohol allyl mercaptan, methallylamine; and azlactones, such as 2-alkenyl-4,4-dialkylazlactone of the structure

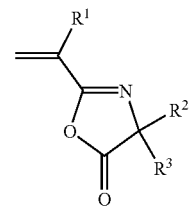

where $R^1$=H, or alkyl groups having 1 to 5 carbons, preferably one carbon, $R^2$ and $R^3$ are independently lower alkyl groups having 1 to 8 carbons, preferably 1 to 4 carbons.

Most preferably, however, the grafting mechanism is accomplished by grafting an ethylenically-unsaturated isocyanate (e.g., dimethyl-m-isopropenyl benzylisocyanate, available from American Cyanamid) to hydroxyl groups previously incorporated into the graft stabilizer precursor (e.g., by use of hydroxy ethyl methacrylate).

The core polymer may be made in situ by copolymerization with the stabilizer monomer. The composition of the insoluble resin core is preferentially manipulated such that the resin core exhibits a low glass transition temperature (Tg) that allows one to formulate an ink composition containing the resin as a major component to undergo rapid film formation (rapid self-fixing) in printing or imaging processes carried out at temperatures greater than the core Tg, preferably at or above 23° C. Rapid self-fixing assists in avoiding printing defects (such as smearing or trailing-edge tailing) and incomplete transfer in high speed printing. The core Tg of should be below 23° C., more preferably less than 10° C., most preferably less than −10° C.

Non-limiting examples of polymerizable organic compounds suitable for use in the organosol core include monomers such as, methyl acrylate, ethyl acrylate, butyl acrylate, methyl(methacrylate), ethyl(methacrylate), butyl (methacrylate), and other acrylates and methacrylates, most preferred being methylmethacrylate and ethylacrylate.

To form a stable ink dispersion, the organosol particles should have the ability to interact strongly with the colorant pigment particles. This requires that organosol particles contain moieties that can either chemical bond to or physical adsorb onto the pigment surface. This invention discovers that a nitrogen-containing polymerizable organic compound incorporated in the organosol core can promote the interaction between the organosol and the pigment and thus stabilize the ink dispersion. Non-limiting examples of nitrogen-containing polymerizable organic compounds are selected from the group consisting of (meth)acrylates having aliphatic amino radicals such as N,N-dimethylaminoethyl (meth)acrylate, N,N-diethylaminoethyl(meth)acrylate, N,N-dibutylaminoethyl(meth)acrylate, N,N-hydroxyethylaminoethyl(meth)acrylate, N-benzyl,N-ethylaminoethyl(meth)acrylate, N,N-dibenzylaminoethyl (meth)acrylate, N-octyl,N,N-dihexylaminoethyl(meth) acrylate and the like; nitrogen-containing heterocyclic vinyl monomers such as N-vinylimidazole, N-vinylindazole, N-vinyltetrazole, 2-vinylpyridine, 4-vinylpyridine, 2-methyl-5-vinylpyridine, 2-vinylquinoline, 4-vinylquinoline, 2-vinylpyrazine, 2-vinyloxazole, 2-vinylbenzooxazole and the like; N-vinyl substituted ring-like amide monomers are structured as N-vinyl groups bonded to ring structures having internal amide groups, such as N-vinylpyrrolidone, N-vinylpiperidone, N-vinyloxazolidone and the like (as disclosed in U.S. Pat. No. 5,953,566; (meth)acrylamides such as N-methylacrylamide, N-octylacrylamide, N-phenylmethacrylamide, N-cyclohexylacrylamide, N-phenylethylacrylamide, N-p-methoxy-phenylacrylamide, acrylamide, N,N-dimethylacrylamide, N,N-dibutylacrylamide, N-methyl,N-phenylacrylamide, piperidine acrylate, morpholine acrylate and the like; aromatic substituted ethylene monomers containing amino radicals such as dimethiaminostyrene, diethylamninostyrene, diethylaminomethylstyrene, dioctylaminostyrene and the like; and nitrogen-containing vinylether monomers such as vinyl-N-ethyl-N-phenylaminoethylether, vinyl-N-butyl-N-phenylaminoethylether, triethanolamine divinylether, vinyldiphenylaminoethylether, vinypyrrolizylaminoether, vinyl-beta-morpholinoethylether, N-vinylhydroxyethylbenzamide, m-aminophenylvinylether and the like.

Other polymers which may be used either alone or in conjunction with the aforementioned materials, include melamine and melamine formaldehyde resins, phenol formaldehyde resins, epoxy resins, polyester resins, styrene and styrene/acrylic copolymers, vinyl acetate and vinyl acetate/acrylic copolymers, acrylic and methacrylic esters, cellulose acetate and cellulose acetate-butyrate copolymers, and poly (vinyl butyral) copolymers. The optimal weight ratio of the resin core to the stabilizer shell is on the order of 1/1 to 15/1, preferably between 2/1 and 10/1, and most preferably between 4/1 and 8/1. Undesirable effects may accompany core/shell ratios selected outside of these ranges. For example, at high core/shell ratios (above 15), there may be insufficient graft stabilizer present to sterically-stabilize the organosol with respect to aggregation. At low core/shell ratios (below 1), the polymerization may have insufficient driving force to form a distinct particulate phase resulting in a copolymer solution, not a self-stable organosol dispersion.

The particle size of the organosols also influences the imaging, drying and transfer characteristics of the liquid inks. Preferably, the primary particle size (which may, for example, be determined with dynamic light scattering measurement techniques) of the organosol is between about 0.05 and 5.0 microns, more preferably between 0.15 and 1 micron, most preferably between 0.20 and 0.50 microns.

A liquid ink utilizing the aforementioned organosol comprises colorant particles embedded in the thermoplastic organosol resin. Useful colorants are well known in the art and include materials such as dyes, stains, and pigments. Preferred colorants are pigments that may be incorporated into the polymer resin, are nominally insoluble in and nonreactive with the carrier liquid, and are useful and effective in making visible the latent electrostatic image. Non-limiting examples of typically suitable colorants include: phthalocyanine blue (C.I. Pigment Blue 15:1, 15:2, 15:3 and 15:4), monoarylide yellow (C.I. Pigment Yellow 1, 3, 65, 73 and 74), diarylide yellow (C.I. Pigment Yellow 12, 13, 14, 17 and 83), arylamide (Hansa) yellow (C.I. Pigment Yellow 10, 97, 105, 138 and 111), azo red (C.I. Pigment Red 3, 17, 22, 23, 38, 48:1, 48:2, 52:1, 81, 81:4 and 179), quinacridone magenta (C.I. Pigment Red 122, 202 and 209) and black pigments such as finely divided carbon (Cabot Monarch 120, Cabot Regal 300R, Cabot Regal 350R, Vulcan X72) and the like.

The optimal weight ratio of resin to colorant in the toner particles is on the order of 1/1 to 20/1, preferably between 3/1 and 10/1 and most preferably between 5/1 and 8/1. The total dispersed material in the carrier liquid typically represents 0.5 to 70 weight percent, preferably between 1 and 25 weight percent, most preferably between 2 and 12 weight percent of the total liquid developer composition.

An electrophotographic liquid toner may be formulated by incorporating a charge control agent into the liquid ink. The charge control agent, also known as a charge director, provides improved uniform charge polarity of the toner particles. The charge director may be incorporated into the toner particles using a variety of methods, such as chemically reacting the charge director with the toner particle, chemically or physically adsorbing the charge director onto the toner particle (resin or pigment), or chelating the charge director to a functional group incorporated into the toner particle. A preferred method is attachment via a functional group built into the graft stabilizer. The charge director acts to impart an electrical charge of selected polarity onto the toner particles. Any number of charge directors described in the art may be used. For example, the charge director may be introduced in the form of metal salts consisting of polyvalent metal ions and organic anions as the counterion. Non-limiting examples of suitable metal ions include Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), and Ti(IV). Non-limiting examples of suitable organic anions include carboxylates or sulfonates derived from aliphatic or aromatic carboxylic or sulfonic acids, preferably aliphatic fatty acids such as stearic acid, behenic acid, neodecanoic acid, diisopropylsalicylic acid, octanoic acid, abietic acid, naphthenic acid, octanoic acid, lauric acid, tallic acid, and the like. Preferred positive charge directors are the metallic carboxylates (soaps) described in U.S. Pat. No. 3,411,936, incorporated herein by reference, which include alkaline earth- and heavy-metallic salts of fatty acids containing at least 6–7 carbons and cyclic aliphatic acids including naphthenic acid; more preferred are polyvalent metal soaps of zirconium and aluminum; most preferred is the zirconium soap of octanoic acid (Zirconium HEX-CEM from Mooney Chemicals, Cleveland, Ohio).

The preferred charge direction levels for a given toner formulation will depend upon a number of factors, including the composition of the graft stabilizer and organosol, the molecular weight of the organosol, the particle size of the organosol, the core/shell ratio of the graft stabilizer, the pigment used in making the toner, and the ratio of organosol to pigment. In addition, preferred charge direction levels will also depend upon the nature of the electrophotographic imaging process, particularly the design of the developing hardware and photoreceptive element. Those skilled in the art, however, know how to adjust the level of charge direction based on the listed parameters to achieve the desired results for their particular application.

The conductivity of a liquid toner has been well established in the art as a measure of the effectiveness of a toner in developing electrophotographic images. The most useful conductivity range is from about $1 \times 10^{-11}$ mho/cm to $10 \times 10^{-10}$ mho/cm. High conductivities generally indicate inefficient association of the charges on the toner particles and is seen in the low relationship between current density and toner deposited during development. Low conductivities indicate little or no charging of the toner particles and lead to very low development rates. The use of charge director compounds to ensure sufficient charge associated with each particle is a common practice. There has, in recent times, been a realization that even with the use of charge directors there can be much unwanted charge situated on charged species in solution in the carrier liquid. Such unwanted charge produces inefficiency, instability and inconsistency in the development.

Suitable efforts to localize the charges onto the toner particles and to ensure that there is substantially no migration of charge from those particles into the liquid, and that no other unwanted charge moieties are present in the liquid, give substantial improvements. As a measure of the required properties, we use the ratio between the conductivity of the carrier liquid as it appears in the liquid toner and the conductivity of the liquid toner as a whole (the completely constituted toner dispersion). This ratio should be less than 0.6 preferably less than 0.4 and most preferably less than 0.3. Many prior art toners examined have shown ratios much larger than this, in the region of a ratio of 0.95.

Any number of methods may be used for effecting particle size reduction of the pigment in preparation of the gel liquid toners. Some suitable methods include high shear homogenization, ball-milling, attritor milling, high energy bead(sand) milling or other means known in the art.

In electrophotography, the electrostatic image is typically formed on a sheet, drum or belt coated with a photoreceptive element by (1) uniformly charging the photoreceptive element with an applied voltage, (2) exposing and discharging portions of the photoreceptive element with a radiation source to form a latent image, (3) applying a toner to the latent image to form a toned image, and (4) transferring the toned image through one or more steps to a final receptor sheet. In some applications, it may be desirable to fix the toned image using a heated pressure roller or other fixing methods known in the art.

While the electrostatic charge of either the toner particles or photoreceptive element may be either positive or negative, electrophotography as employed in the present invention is preferably carried out by dissipating charge on a positively charged photoreceptive element. A positively-charged toner is then applied to the regions in which the positive charge was dissipated using a liquid toner immersion development technique. This development may be accomplished by using a uniform electric field produced by a development electrode spaced near the photoreceptive element surface. A bias voltage is applied to the electrode intermediate to the initially charged surface voltage and the exposed surface voltage level. The voltage is adjusted to obtain the required maximum density level and tone reproduction scale for halftone dots without any background deposited. Liquid toner is then caused to flow between the electrode and the photoreceptive element. The charged toner particles are mobile in the field and are attracted to the discharged areas on the photoreceptive element while being repelled from the undischarged, non-image areas. Excess liquid toner remaining on the photoreceptive element is removed by techniques well known in the art. Thereafter, the photoreceptive element surface may be force dried or allowed to dry at ambient conditions.

The substrate for receiving the image from the photoreceptive element can be any commonly used receptor material, such as paper, coated paper, polymeric films and primed or coated polymeric films. Specially coated or treated metal or metallized surfaces may also be used as receptors. Polymeric films include plasticized and compounded polyvinyl chloride (PVC), acrylics, polyurethanes, polyethylene/acrylic acid copolymer, and polyvinyl butyrals. Commercially available composite materials such as those having the trade designations Scotchcal™, Scotchlite™, and Panaflex™ film materials are also suitable for preparing substrates.

The transfer of the formed image from the charged surface to the final receptor or transfer medium may be enhanced by the incorporation of a release-promoting material within the dispersed particles used to form the image. The incorporation of a silicone-containing material or a fluorine-containing material in the outer (shell) layer of the particle facilitates the efficient transfer of the image.

In multicolor imaging, the toners may be applied to the surface of the dielectric element or photoreceptive element in any order, but for colorimetric reasons, bearing in mind the inversion that occurs on transfer, it is sometimes preferred to apply the images in a specified order depending upon the transparency and intensity of the colors. A preferred order for a direct imaging or a double transfer process is yellow, magenta, cyan and black; for a single transfer process, the preferred order is black, cyan, magenta and yellow. Yellow is generally imaged first on the photoconductor to avoid contamination from other toners and to be the topmost color layer when transferred. Black is generally imaged last on the photoconductor due to the black toner acting as a filter of the radiation source and to be the bottom-most layer after transfer.

In order to function most effectively, liquid toners should have conductance values in the range of 50 to 1200 picomho-cm$^{-1}$. Liquid toners prepared according to the present invention have conductance values of from 100 to 500 picomho-cm$^{-1}$ for a dispersion containing 2.5% by weight solids.

Overcoating of the transferred image may optionally be carried out to protect the image from physical damage and/or actinic damage. Compositions for overcoatings are well known in the art and typically comprise a clear film-forming polymer dissolved or suspended in a volatile solvent. An ultraviolet light absorbing agent may optionally be added to the coating composition. Lamination of protective layers to the image-bearing surface is also well known in the art and may be used with this invention.

These and other aspects of the present invention are demonstrated in the illustrative examples that follow. These examples are to be viewed as illustrative of specific materials falling within the broader disclosure presented above and are not to be viewed as limiting the broader disclosure.

EXAMPLES

Glossary of Chemical Abbreviations & Chemical Sources

The following raw materials were used to prepare the polymers in the examples which follow:

The catalysts used in the examples are Azobisisobutyronitrile (designated as AIBN, commercially obtained as VAZO™-64 from DuPont Chemicals, Wilmington, Del.); Dibutyl Tin Dilaurate (designated as DBTDL, commercially obtained from Aldrich Chemical Co., Milwaukee, Wis.); and 2,2'-Azobisisobutyronitrile (designated as AZDN, commercially obtained from Elf Atochem, Philadelphia, Pa.). The monomers are all available from Scientific Polymer Products, Inc., Ontario, N.Y. unless designated otherwise.

The monomers used in the examples are designated by the following abbreviations: Dimethyl-m-isopropenyl benzylisocyanate (TMI, commercially obtained from CYTEC Industries, West Paterson, N.J.); Ethyl Acrylate (EA); 2-Ethylhexyl Methacrylate (EHMA); 2-Hydroxyethyl Methacrylate (HEMA); 3,3,5-trimethylcyclohexyl methacrylate (TCHMA); lauryl methacrylate (LMA); methyl methacrylate (MMA); isobornyl methacrylate (IBMA); octadecyl methacrylate (ODA); and N,N-dimethylaminoethyl methacrylate (DMAEMA).

Test Methods

The following test methods were used to characterize the polymers and inks in the examples that follow:

Percent Solids of Graft Stabilizer, Organosol, and Liquid Toner

Percent solids of the graft stabilizer solutions, and the organosol and ink dispersions, were determined gravimetrically using a halogen lamp drying oven attachment to a precision analytical balance (commercially obtained from Mettler Instruments Inc., Hightstown, N.J.). Approximately two grams of sample were used in each determination of percent solids using this sample dry down method.

Graft Stabilizer Molecular Weight

Various properties of the graft stabilizer have been determined to be important to the performance of the stabilizer, including molecular weight and molecular weight polydispersity. Graft stabilizer molecular weight is normally expressed in terms of the weight average molecular weight ($M_w$), while molecular weight polydispersity is given by the ratio of the weight average molecular weight to the number average molecular weight ($M_w/M_n$). Molecular weight parameters were determined for graft stabilizers with gel permeation chromatography (GPC) using tetrahydrofuran as the carrier solvent. Absolute $M_w$ was determined using a Dawn DSP-F light scattering detector (commercially obtained from Wyatt Technology Corp, Santa Barbara, Calif.), while polydispersity was evaluated by ratioing the measured $M_w$ to a value of $M_n$ determined with an Optilab 903 differential refractometer detector (commercially obtained from Wyatt Technology Corp, Santa Barbara, Calif.).

Particle Size

Toner particle size distributions were determined using a Horiba LA-900 laser diffraction particle size analyzer (commercially obtained from Horiba Instruments, Inc, Irvine, Calif.). Toner samples were diluted approximately 1/500 by volume and sonicated for one minute at 150 watts and 20 kHz prior to measurement. Toner particle size was expressed on a number-average basis in order to provide an indication of the fundamental (primary) particle size of the ink particles.

Toner Conductivity

The liquid toner conductivity (bulk conductivity, $k_b$) was determined at approximately 18 Hz using a Scientifica model 627 conductivity meter (commercially obtained from Scientifica Instruments, Inc., Princeton, N.J.). In addition, the free (dispersant) phase conductivity ($k_f$) in the absence of toner particles was also determined. Toner particles were removed from the liquid milieu by centrifuigation at 5° C. for 1–2 hours at 6,000 rpm (6,110 relative centrifugal force) in a Jouan MR1822 centrifuge (commercially obtained from Jouan Inc., Winchester, Va.). The supernatant liquid was then carefully decanted, and the conductivity of this liquid was measured using a Scientific a Model 627 conductance meter. The percentage of free phase conductivity relative to the bulk toner conductivity was then determined as: 100% ($k_f/k_b$).

Particle Mobility

Toner particle electrophoretic mobility (dynamic mobility) was measured using a Matec MBS-8000 Electrokinetic Sonic Amplitude Analyzer (commercially obtained from Matec Applied Sciences, Inc., Hopkinton, Mass.). Unlike electrokinetic measurements based upon microelectrophoresis, the MBS-8000 instrument has the advantage of requiring no dilution of the toner sample in order to obtain the mobility value. Thus, it was possible to measure toner particle dynamic mobility at solids concentrations actually preferred in printing. The MBS-8000 measures the response of charged particles to high frequency (1.2 MHz) alternating (AC) electric fields. In a high frequency AC electric field, the relative motion between charged toner particles and the surrounding dispersion medium (including counter-ions) generates an ultrasonic wave at the same frequency of the applied electric field. The amplitude of this ultrasonic wave at 1.2 MHz can be measured using a piezoelectric quartz transducer; this electrokinetic sonic amplitude (ESA) is directly proportional to the low field AC electrophoretic mobility of the particles. The particle zeta potential can then be computed by the instrument from the measured dynamic mobility and the known toner particle size, dispersant liquid viscosity, and liquid dielectric constant.

Particle Charge

Toner charge/mass is an important, albeit difficult to determine parameter useful in predicting the development characteristics (e.g. optical density, overtoning uniformity) for liquid toners. The difficult in determining charge/mass for liquid toners arises from the low developed toner mass (typically 50–200 micro grams/cm$^2$) associated with the desired developed optical densities (typically>1.2 reflectance optical density units). A related parameter which is directly proportional to toner charge/mass is the toner charge/developed optical density. This parameter was determined by plating ink particles in distinct bands covering a range of known plating potentials onto a dielectric sheet coated with a silicone release layer while simultaneously monitoring the total current flow with a sensitive electrometer. The resulting plated toner layer was then air dried and transferred using an offset transfer process to plain paper. The reflectance optical density of the completely transferred toner film on paper was determined using a Gretag® SPM50 reflectance optical densitometer (commercially obtained from Gretag Instruments Inc., Regensdorf, Switzerland). The ratio of the total current to the product of the plated toner area and the developed optical density yields the charge/ROD value for that toner, i.e. Charge/ROD=(Total Current)/[(Plated Area)(Reflectance Optical Density)].

Blocking Resistance Test

Laser printed solid blocks (100% coverage, optical density=1.3) of the toners from Example 3 and Comparative Example B were printed on ordinary uncoated A4 paper (Xerox 4200 copier paper) and tested according to ASTM test method D1146 in a humidity chamber at 48±1° C. and 75% relative humidity for 24 hours.

At the end of this period, the ink images printed using the toner from Example 3 showed no adhesive blocking or image damage when the image and paper were separated. Slight cohesive failure was observed for this ink but no image damage was observed when the sheets were separated.

In contrast, the ink images printed using the toner from Comparative Example B showed adhesive blocking (ink to paper blocking, as would be observed in a printed stack of single-sided images, i.e. front to back), but showed no image damage when the image and paper were separated. Cohesive failure was observed for the ink images (ink to ink blocking), as would be observed in a printed stack of duplexed sheets. In addition, image damage was observed when the sheets were separated.

A number of embodiments of the invention have been described. Nevertheless, it will be understood that various modifications may be made without departing from the spirit and scope of the invention. Accordingly, other embodiments are within the scope of the following claims.

Preparation of Graft Stabilizers

In the following example of graft stabilizer preparation, it will be convenient to summarize the compositional details of each particular graft stabilizer or graft stabilizer precursor by ratioing the weight percentage of monomers employed in the synthesis. For example, a graft stabilizer designated EHMA/HEMA-TMI (97/3-4.7% w/w) is made from a graft stabilizer precursor which is a copolymer consisting of 97% weight percent EHMA and 3% weight percent HEMA, to which is covalently bonded a grafting site consisting of 4.7 weight percent TMI based on the total weight of the graft stabilizer precursor.

Comparative Example A

To a 5000 ml 3-neck round flask equipped with a condenser, a thermocouple connected to a digital temperature controller, a nitrogen inlet tube connected to a source of dry nitrogen and a magnetic stirrer, was charged with a mixture of 2560 g of Norpar™12, 849 g of EHMA, 27 g of 96% HEMA, and 8.8 g of AIBN. While the mixture was stirred magnetically, the reaction flask was purged with dry nitrogen for 30 minutes at a flow rate of approximately 2 liters/minute. A hollow glass stopper was then inserted into the open end of the condenser and the nitrogen flow rate was reduced to approximately 0.5 liters/min. The mixture was heated to 70° C. for 16 hours. The conversion was quantitative.

The mixture was heated to 90° C. and held at that temperature for 1 hour to destroy any residual AIBN, then was cooled back to 70° C. After the nitrogen inlet tube was removed, 13.6 g of 95% DBTDL was added to the mixture, followed by 41.1 g of TMI. TMI was added drop wise over approximately 5 minutes while the mixture was stirred magnetically. The nitrogen inlet tube was reinserted, the hollow glass stopper in the condenser was removed, and then the reaction flask was purged with dry nitrogen for 30 minutes at a flow rate of approximately 2 liters/minute. The hollow glass stopper was reinserted into the open end of the condenser and the nitrogen flow rate was reduced to approximately 0.5 liters/min. The mixture was allowed to react at 70° C. for 6 hours and then cooled to room temperature. The cooled mixture was a viscous, transparent liquid containing no visible insoluble matter. The conversion was quantitative.

The product is a copolymer of EHMA and HEMA containing random side chains of TMI and suitable for making gel organosols. It is designated herein as EHMA/HEMA-TMI (97/3-4.7% w/w It was tested according to the methods described in the Test Method section. The percent of solids was 27.42%. The copolymer had a $M_w$ of 202,100 Da and a $M_w/M_n$ of 2.17, based on two independent measurements.

Comparative Example B

Comparative Example B was prepared according to the procedure for Comparative Example A except that 2372 g of Norpar™12, 1019 g of LMA, 33 g of 96% HEMA and 10.5 g of AIBN replaced 2560 g of Norpar™12, 849 g of EHMA, 27 g of 96% HEMA, and 8.8 g of AIBN; and the amount of 95% DBTDL was increased to 16.3 g. The cooled mixture was viscous, transparent solution, containing no visible insoluble mater.

The product is a copolymer of LMA and HEMA containing random side chains of TMI and suitable for making non-gel organosols. It is designated herein as LMA/HEMA-TMI (97/3-4.7% w/w). It was tested according to the methods described in the Test Method section. The percent of solids was 30.0%. The copolymer had a $M_w$ of 197,750 Da and a $M_w/M_n$ of 1.84, based upon two independent measurements.

Example 1

To a narrow-mouthed glass bottle (32 ounce; 907 ml) was charged 483 g of Norpar™ 12, 80 g of LMA, 80 g of TCHMA, 3 g of 98% HEMA, and 0.95 g of AZDN. The bottle was purged for 1 minute with dry nitrogen at a rate of approximately 1.5 liters/min, then sealed with a screw cap fitted with a Teflon liner. The cap was secured in place using an electrical tape. The sealed bottle was then inserted into a metal cage assembly and installed on the agitator assembly of an Atlas Launder-Ometer (commercially obtained from Atlas Electric Devices Company, Chicago, Ill.). The Launder-Ometer was operated at its fixed agitation speed of 42 rpm with a water bath at a temperature of 70° C. The mixture was allowed to react at 70° C. for 17 hours, heated to 90° C. for 1 hour to destroy any residual AZDN, and cooled to room temperature. The conversion of monomer to polymer was quantitative. The bottle was then opened and 2.6 g of 95% DBTDL and 7.8 g of TMI were added to the mixture. The bottle was purged for 1 minute with dry nitrogen at a rate of approximately 1.5 liters/min, then sealed with a screw cap fitted with Teflon liner. The cap was secured with a screw using an electrical tape. The sealed bottle was then inserted into a metal cage assembly and installed on the agitator assembly of the Atlas Launder-Ometer. The Launder-Ometer was operated at its fixed agitation speed of 42 rpm with a water bath at a temperature of 70° C. The mixture was allowed to react at 70° C. for 5 hours, and then cooled to room temperature. The cooled mixture was a viscous, transparent solution, containing no visible insoluble mater. The conversion was quantitative.

The product is a copolymer of LMA, TCHMA and HEMA containing random side chains of TMI. This resultant copolymer can be used to prepare non-gel organosols. It is designated herein as LMA/TCHMA/HEMA-TMI (48.5/48.5/3-4.7 w/w %). It was tested according to the methods described in the Test Method section. The percent of solids was 25.76. The copolymer had a $M_w$ of 181,110 Da and a $M_w/M_n$ of 1.92.

Example 2

Example 2 was prepared according to the procedure for Example 1 except that TCHMA was replaced by IBMA; and that the amounts of 98% HEMA and AZDN were increased to 5.1 g and 1.57 g respectively. The cooled mixture was a viscous, transparent solution, containing no visible insoluble mater.

The product is a copolymer of LMA, IBMA and HEMA containing random side chains of TMI and can be used to prepare non-gel organosols. It is designated herein as LMA/IBMA/HEMA-TMI (48.5/48.5/3-4.7 w/w %). It was tested according to the methods described in the Test Method section. The percent of solids was 25.55%. The copolymer had a $M_w$ of 146,500 Da and a $M_w/M_n$ of 1.97.

Example 3

Example 3 was prepared according to the procedure for Example 2 except that IBMA was replaced by ODA. The cooled mixture was a viscous, transparent solution, containing no visible insoluble mater.

The product is a copolymer of LMA, ODA and HEMA containing random side chains of TMI and can be used to prepare non-gel organosols. It is designated herein as LMA/ODA/HEMA-TMI (48.5148.5/3-4.7 w/w %). It was tested according to the methods described in the Test Method section. The percent of solids was 26.57%. The copolymer had a $M_w$ of 179,200 Da and a $M_w/M_n$ of 2.00.

Example 4

Example 4 was prepared according to the procedure for Example 1 except that 80 g of LMA, 80 g of TCHMA, 3 g of 98% HEMA and 0.95 g of AZDN were replaced with 107 g of LMA, 53 g of TCHMA, 5.1 g of 98% HEMA and 1.57 g of AZDN. The cooled mixture was a viscous, transparent solution, containing no visible insoluble mater.

The product is a copolymer of LMA, TCHMA and HEMA containing random side chains of TMI and can be used to prepare non-gel organosols. It is designated herein as LMA/TCHMA/HEMA-TMI (32/65/3-4.7 w/w %). It was tested according to the methods described in the Test Method section. The percent of solids was 25.87%. The copolymer had a $M_w$ of 204,000 Da and a $M_w/M_n$ of 2.26.

TABLE 1

Graft Stabilizers

| Sample | Graft Stabilizer Compositions (% w/w) | Molecular Weight Mw | Mw/Mn | Tg (° C.) |
| --- | --- | --- | --- | --- |
| Comparative Example A | EHMA/HEMA-TMI (97/3–4.7) | 202,100 | 2.17 | −10 |
| Comparative Example B | LMA/HEMA-TMI (97/3–4.7) | 197,750 | 1.84 | −65 |
| Example 1 | LMA/TCHMA/HEMA-TMI (48.5/48.5/3–4.7) | 181,110 | 1.92 | 0 |
| Example 2 | LMA/IBMA/HEMA-TMI (48.5/48.5/3–4.7) | 146,500 | 1.97 | −7 |
| Example 3 | LMA/ODA/HEMA-TMI (48.5/48.5/3–4.7) | 179,200 | 2.00 | 35 (mp) |
| Example 4 | LMA/TCHMA/HEMA-TMI (32/65/3–4.7) | 204,000 | 2.26 | 33 |

Preparations of Organosols

In the following examples of organosol preparation, it will be convenient to summarize the composition of the organosol in terms of the ratio of the total weight of monomers comprising the organosol core relative to the total weight of monomers comprising the organosol shell. The ratio is referred to as the core/shell ratio of the organosol. In addition, it will be useful to summarize the compositional details of each particular organosol by ratioing the weight percentages of monomers used to create the shell and the core. For example, an organosol designated EHMA/EMA-TMI//MMA/EA (97/3-4.7//25/75% w/w) is made form shell comprised of graft stabilizer precursor which is a copolymer consisting of 97 weight percent of EHMA and 3 weight percent of HEMA, to which is covalently bonded a grafting site consisting of 4.7 weight percent of TMI based on the total weight of graft stabilizer precursor. The graft stabilizer is covalently bonded to a core that is comprised of 25 weight percent MMA and 75 weight percent of EA.

Comparative Example C

To a 5000 ml 3-neck round flask equipped with a condenser, a thermocouple connected to a digital temperature controller, a nitrogen inlet tube connected to a source of dry nitrogen, and a magnetic stirrer, was charged with a mixture of 2950 g of Norpar™12, 281 g of EA, 93 g of MMA, 170 g of Comparative Example A at 27.42% solids, and 6.3 g of AIBN. While the mixture was stirred magnetically, the reaction flask was purged with dry nitrogen for 30 minutes at a flow rate of approximately 2 liters/minute. A hollow glass stopper was then inserted into the open end of the condenser and the nitrogen flow rate was reduced to approximately 0.5 liters/min. The mixture was heated to 70° C. for 16 hours and then cooled to room temperature. The conversion was quantitative. Approximately 350 g of n-heptane were added to the cooled mixture. The resulting mixture was stripped of residual monomer using a rotary evaporator equipped with a dry ice/acetone condenser and a water bath at a temperature of 90° C. at a vacuum of approximately 15 mm Hg. The stripped mixture was cooled to room temperature to yield an opaque white dispersion that formed a weak gel in approximately 2 hours.

This gel organosol is designated EHMA/HEMA-TMI//MMA/EA (97/3-4.7//25/75% w/w) and can be used to prepare rapid self-fixing gel ink formulations. It was tested according to the methods described in the Test Method section. The percent of solids was 12.70%.

Comparative Example D

Comparative Example D was prepared according to the procedure for Comparative Example C except 529.77 g of Norpar™12, 36.27 g of EA, 19.95 g of MMA, 56.89 g of Comparative Example A at 27.42% solids, and 0.94 g of AIBN were used.

This gel organosol is designated EHMA/HEMA-TMI//MMA/EA/DMAEMA (97/3-4.7//22.5/67.5/10% w/w) and can be used to prepare rapid self-fixing gel ink formulations. It was tested according to the methods described in the Test Method section. The percent of solids was 17.02%.

Example 5

To a narrow-mouthed glass bottle (32 ounce, 907 mnl) was charged with 527 g of Norpar™12, 22.14 g MMA, 40.26 g of EA, 60 g of Example 1 at 25.76% solids, and 0.94 g AIBN. The bottle was purged for 1 minute with dry nitrogen at a rate of approximately 1.5 liters/min, then sealed with a screw cap fitted with a Teflon liner. The cap was secured in place using an electrical tape. The sealed bottle was then inserted into a metal cage assembly and installed on the agitator assembly of an Atlas Launder-Ometer (commercially obtained from Atlas Electric Devices Company, Chicago, Ill.). The Launder-Ometer was operated at its fixed agitation speed of 42 rpm with a water bath at a temperature of 70° C. The mixture was allowed to react for 17 hours and then cooled to room temperature. The conversion of monomer to polymer was quantitative. The resulting mixture was stripped of residual monomer using a rotary evaporator equipped with a dry ice/acetone condenser and operating at a temperature of 90° C. at a vacuum of approximately 15 mm Hg. The stripped organosol was cooled to room temperature to yield an opaque white dispersion that did not gel.

This organosol is designated LMA/TCHMA/HEMA-TMI//MMA/EA (48.4/48.5/3-4.7//125/75% w/w) and can be used to prepare rapid self-fixing non-gel ink formulations. The percentage of solids was 17.00% by weight.

Example 6

Example 6 was prepared according to the procedure for Example 5, except that 527 g of Norpar™12, 22.14 g MMA, 40.26 g of EA, 60 g of Example 2 at 25.55% solids, and 0.94 g AIBN were used. An opaque white dispersion was obtained and it did not gel.

This organosol is designated LMA/IBMA/HEMA-TMI//MMA/EA (48.4/48.5/3-4.7//25/75/% w/w) and can be used to prepare rapid self-fixing non-gel ink formulations. The percentage of solids was 15.4% by weight.

Example 7

Example 7 was prepared according to the procedure for Example 5, except that 527 g of Norpar™12, 22.14 g MMA, 40.26 g of EA, 60 g of Example 3 at 26.57% solids, and 0.94 g AIBN were used. An opaque white dispersion was obtained and it did not gel.

This organosol is designated LMA/ODA/HEMA-TMI//MMA/EA (48.4/48.5/3-4.7//25/75/% w/w) and can be used to prepare rapid self-fixing non-gel ink formulations. The percentage of solids was 18.31% by weight.

Example 8

Example 8 was prepared according to the procedure for Example 5, except that 527 g of Norpar™12, 20 g MMA, 36 g of EA, 6.18 g of DMAEMA, 60 g of Example 1 at 25.76% solids, and 0.94 g AIBN were used. An opaque white dispersion was obtained and it did not gel.

This organosol is designated LMA/TCHMA/HEMA-TMI//MMA/EA-DMAEMA (48.5/48.5/3-4.7//22.5/67.5/10% w/w) and can be used to prepare rapid self-fixing non-gel ink formulations. The percentage of solids was 17.36% by weight.

Example 9

Example 9 was prepared according to the procedure for Example 5, except that 527 g of Norpar™12, 20 g MMA, 36 g of EA, 6.18 g of DMAEMA, 60 g of Example 2 at 25.55% solids, and 0.94 g AIBN were used. An opaque white dispersion was obtained and it did not gel.

This organosol is designated LMA/IBMA/HEMA-TMI//MMA/EA-DMAEMA (48.5/48.5/3-4.7//22.5/67.5/10% w/w) and can be used to prepare rapid self-fixing non-gel ink formulations. The percentage of solids was 17.5% by weight.

Example 10

Example 10 was prepared according to the procedure for Example 5, except that 527g of Norpar™12, 20 g MMA, 36 g of EA, 6.18 g of DMAEMA, 60 g of Example 2 at 25.55% solids, and 0.94 g AIBN were used. An opaque white dispersion was obtained and it did not gel.

This organosol is designated LMA/IBMA/HEMA-TMI//MMA/EA-DMAEMA (48.5148.5/3-4.7//22.5/67.5/10% w/w) and can be used to prepare rapid self-fixing non-gel ink formulations. The percentage of solids was 17.87% by weight.

Example 11

Example 11 was prepared according to the procedure for Example 5, except that 527 g of Norpar™12, 20 g MMA, 36 g of EA, 6.18 g of DMAEMA, 60 g of Example 4 at 25.87% solids, and 0.94 g AIBN were used. An opaque white dispersion was obtained and it did not gel.

This organosol is designated LMA/TCHMA/HEMA-TMI//MMA/EA-DMAEMA (32/65/3-4.7//22.5/67.5/10% w/w) and can be used to prepare rapid self-fixing non-gel ink formulations.

Example 12

Example 12 was prepared according to the procedure for Example 5, except that 527 g of Norpar™12, 20 g MMA, 36 g of EA, 6.18 g of vinylpyrrolidinone, 60 g of Example 4 at 25.87% polymer solids, and 0.94 g AIBN were combined in a reaction bottle. An opaque white dispersion was obtained and it did not gel.

This organosol is designated LMA/TCHMA/HEMA-TMI//MMA/EA/VP (32/65/3-4.7//22.5/67.5/10% w/w) and can be used to prepare rapid self-linng non-gel ink formulations.

Example 13

Example 13 was prepared according to the procedure for Example, 5 except that 527 g of Norpar™12, 20 g MMA, 36 g of EA, 6.18 g of vinylimidazole, 60 g of Example 4 at 25.87% solids, and 0.94 g AIBN were used. An opaque white dispersion was obtained and it did not gel.

This organosol is designated LMA/TCHMA/HEMA-TMI//MMA/EA/VIM (32/65/3-4.7//22.5/67.5/10% w/w) and can be used to prepare rapid self-fixing non-gel ink formulations.

TABLE 2

Organosols

| Sample | Organosol Compositions (% w/w) | Visual Observation |
|---|---|---|
| Comparative Example C | EHMA/HEMA-TMI//MMA/EA (97/3–4.7//25/75) | Gel |
| Comparative Example D | EHMA/HEMA-TMI//MMA/EA/DMAEMA (97/3–4.7//22.5/67.5/10) | Slightly gel |
| Example 5 | LMA/TCHMA/HEMA-TMI//MMA/EA (48.5/48.5/3–4.7//25/75) | Non-gel |
| Example 6 | LMA/IBMA/HEMA-TMI//MMA/EA (48.5/48.5/3–4.7//25/75) | Non-gel |
| Example 7 | LMA/ODA/HEMA-TMI//MMA/EA (48.5/48.5/3–4.7//25/75) | Non-gel |
| Example 8 | LMA/TCHMA/HEMA-TMI//MMA/EA/DMAEMA (48.5/48.5/3–4.7//22.5/67.5/10) | Non-gel |
| Example 9 | LMA/IBMA/HEMA-TMI//MMA/EA/DMAEMA (48.5/48.5/3–4.7//22.5/67.5/10) | Non-gel |
| Example 10 | LMA/ODA/HEMA-TMI//MMA/EA/DMAEMA (48.5/48.5/3–4.7//22.5/67.5/10) | Non-gel |

TABLE 2-continued

Organosols

| Sample | Organosol Compositions (% w/w) | Visual Observation |
|---|---|---|
| Example 11 | LMA/TCHMA/HEMA-TMI//MMA/EA/DMAEMA (32/65/3–4.7//22.5/67.5/10) | Non-gel |
| Example 12 | LMA/TCHMA/HEMA-TMI//MMA/EA/vinylpyrrolidinone (32/65/3–4.7//22.5/67.5/10) | Non-gel |
| Example 13 | LMA/TCHMA/HEMA-TMI//MMA/EA/vinylimidazole (32/65/3–4.7//22.5/67.5/10) | Non-gel |

Preparations of Inks

Comparative Example E

Comparative Example D (17.02% (w/w) solids, 169 g) in Norpar™ 12 was combined with 122 g of Norpar™ 12, 3.6 g of Pigment Red 122 (commercially obtained from Sun Chemical Company, Cincinnati, Ohio), 3.6 g of Pigment Red 81:4 (commercially obtained from Sun Chemical Company, Cincinnati Ohio), and 2.02 g of 6.15% Zirconium HEX-CEM solution (commercially obtained from OMG Chemical Company, Cleveland, Ohio) in a glass jar (8 ounce, 227 ml). This mixture was then milled in a 0.5 liter vertical bead mill (Model 6TSG-1/4, commercially obtained from Amex Co., Ltd., Tokyo, Japan) charged with 390 g of 1.3 mm diameter Potters glass beads (commercially obtained from potter Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 3.0% (w/w). This dilute toner sample exhibited the properties listed in Tables 3 and 4 as determined by testing procedures described in the Test Methods section.

Example 14

Example 5 (17.00% (w/w) solids, 169 g) in Norpar™ 12 was combined with 119 g of Norpar™ 12, 7.2 g of Pigment Red 122 (commercially obtained from Sun Chemical Company, Cincinnati, Ohio), and 4.39 g of 6.15% Zirconium HEX-CEM solution (commercially obtained from OMG Chemical Company, Cleveland, Ohio) in a glass jar (8 ounce, 227 ml). This mixture was then milled in a 0.5 liter vertical bead mill (Model 6TSG-1/4, commercially obtained from Amex Co., Ltd., Tokyo, Japan) charged with 390 g of 1.3 mm diameter Potters glass beads (commercially obtained from potter Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 3.0% (w/w). This dilute toner sample exhibited properties as determined by testing procedures described in the Test Methods section. The results are listed in Table 3.

Example 15

Example 15 was prepared according to the procedure for Example 14, except that Example 8 was replaced by Example 6 (187 g, 15.40% (w/w) solids in Norpar™ 12) and the amount of Norpar™ 12 was reduced to 101 g.

This dilute toner sample exhibited properties listed in Table 3 as determined by testing procedures described in the Test Methods section.

Example 16

Example 16 was prepared according to the procedure for Example 14 except that Example 5 was replaced by Example 7 (157 g, 18.31% (w/w) solids in Norpar™ 12) and the amount of of Norpar™ 12 was increased to 131 g.

This dilute toner sample exhibited the properties listed in Table 3 as determined by testing procedures described in the Test Methods section.

Example 17

Example 17 was prepared according to the procedure for Example 14 except that Example 5 was replaced by Example 8 (166 g, 17.36% (w/w) solids in Norpar 12) and the amount of Norpar was increased to 124 g.

This dilute toner sample exhibited properties determined by testing procedures described in the Test Methods section. The results are listed in Table 3.

Example 18

Example 18 was prepared according to the procedure for Example 14 except that Example 5 was replaced by Example 9 (165 g, 17.50% (w/w) solids in Norpar™ 12) and the amount of Norpar™ 12 was increased to 126 g.

This dilute toner sample exhibited properties determined by testing procedures described in the Test Methods section. The results are listed in Table 3.

Example 19

Example 19 was prepared according to the procedure for Example 14 except that Example 5 was replaced by Example 10 (161 g, 17.87% (w/w) solids in Norpar™ 12) and the amount of Norpar™ 12 was increased to 130 g.

This dilute toner sample exhibited properties determined by testing procedures described in the Test Methods section. The results are listed in Table 3.

Example 20

Example 5 (163 g, 17.68% (w/w) solids in Norpar™ 12) was combined with 136 g of Norpar™ 12, 7.2 g of Monarch 120 carbon black (commercially obtained from Cabot Corp., Billerica, Mass.) and 4.32 g of 6.15% Zirconium HEX-CEM solution (commercially obtained from OMG Chemical Company, Cleveland, Ohio) in a glass jar (8 ounce, 227 ml). This mixture was then milled in a 0.5 liter vertical bead mill (Model 6TSG-1/4, commercially obtained from Amex Co., Ltd., Tokyo, Japan) charged with 390 g of 1.3 mm diameter Potters glass beads (commercially obtained from potter Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 3.0% (w/w). This dilute toner sample exhibited properties determined by testing procedures described in the Test Methods section. The test results are listed in Table 4.

Example 21

Example 5 (175 g, 17.68% (w/w) solids in Norpar™ 12) was combined with 116 g of Norpar™ 12, 5.14 g of Pigment Blue 15:4 (commercially obtained from Sun Chemical Company, Cincinnati, Ohio) and 4.32 g of 6.15% Zirconium HEX-CEM solution (commercially obtained from OMG Chemical Company, Cleveland, Ohio) in a glass jar (8 ounce, 227 ml). This mixture was then milled in a 0.5 liter vertical bead mill (Model 6TSG-1/4, commercially obtained from Amex Co., Ltd., Tokyo, Japan) charged with 390 g of 1.3 mm diameter Potters glass beads (commercially obtained from potter Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 3.0% (w/w). This dilute toner sample exhibited properties determined by testing procedures described in the Test Methods section. The test results are listed in Table 4.

TABLE 3

Magenta Inks

| Sample | Dynamic Mobility ($m^2$/Vsec) | Conductivity (pMho/cm) Bulk | Conductivity (pMho/cm) Free Phase | Pigment Size (um) Dv | Pigment Size (um) Dn | Reflection optical density (@ 600 dev) | Blocking (vs. control) |
|---|---|---|---|---|---|---|---|
| Comparative Example E | 4.35E–10 | 133 | 20.8 | 1.528 | 0.689 | — | control |
| Example 14 | 1.15E–10 | 40.5 | 0.77% | 1.398 | 0.407 | 0.72 | — |
| Example 15 | 1.35E–10 | 49.9 | 0.66% | 1.464 | 0.399 | 0.75 | — |
| Example 16 | 0.78E–10 | 53.4 | 2.68% | 1.081 | 0.342 | 0.45 | — |
| Example 17 | 2.58E–10 | 129.3 | 1.06% | 1.267 | 0.388 | 1.18 | Improved |
| Example 18 | 2.12E–10 | 98 | 0.52% | 1.164 | 0.411 | 1.25 | Same |
| Example 19 | 1.51E–10 | 125 | 0.97% | 0.977 | 0.321 | 1.34 | Same |

TABLE 4

Different Color Inks

| Sample | Color * | Dynamic Mobility ($m^2$/Vsec) | Conductivity (pMho/cm) Bulk | Conductivity (pMho/cm) Free Phase | Particle Size (um) Dv | Particle Size (um) Dn | Reflection optical density (@ 600 dev) | Blocking (vs. control) |
|---|---|---|---|---|---|---|---|---|
| Comp. Ex. E | M | 4.35E–10 | 133 | 20.8% | 1.528 | 0.689 | — | control |
| Ex. 17 | M | 2.58E–10 | 129.3 | 1.06% | 1.267 | 0.388 | 1.18 | Improved |
| Ex. 20 | K | 0.93E–10 | 292 | 13.9% | 0.456 | 0.196 | 1.40 | Improved |
| Ex. 21 | C | 2.59E–10 | 300 | 5.13% | 0.507 | 0.174 | 1.31 | Improved |
| Ex. 22 | Y | 2.87E–10 | 292 | 3.81% | 0.690 | 0.243 | 0.87 | Improved |

Note
*: M = margenta; K = black; C = cyan; and Y = yellow cooling water circulating through the cooling jacket of the milling chamber.

A portion of this 12% (w/w) solids toner concentrate was diluted to approximately 3.0% (w/w). This dilute toner sample exhibited properties determined by testing procedures described in the Test Methods section. The test results are listed in Table 4.

Example 22

Example 5 (163 g, 17.68% (w/w) solids in Norpar™ 12) was combined with 126 g of Norpar™ 12, 6.48 g of Pigment Yellow 83 and 0.72 g of Pigment Yellow 138 (commercially obtained from Sun Chemical Company, Cincinnati, Ohio) and 4.32 g of 6.15% Zirconium HEX-CEM solution (commercially obtained from OMG Chemical Company, Cleveland, Ohio) in a glass jar (8 ounce, 227 ml). This mixture was then milled in a 0.5 liter vertical bead mill (Model 6TSG-1/4, commercially obtained from Amex Co., Ltd., Tokyo, Japan) charged with 390 g of 1.3 mm diameter Potters glass beads (commercially obtained from potter Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 3.0% (w/w). This dilute toner sample exhibited properties determined by testing procedures described in the Test Methods section. The test results are listed in Table 4.

What is claimed is:

1. An organasal dispersion comprising: (a) a carrier liquid having a Kauri-Butanol number less than 30; and (b) a graft copolymer comprising a (co)polymeric steric stabilizer covalently bonded to a thermoplastic (co)polymeric core that is insoluble in the carrier liquid, wherein the steric stabilizer comprises units derived from 3,3,5-trimethylcyclohexyl methacrylate.

2. An organosol dispersion according to claim 1 wherein the steric stabilizer further comprises a polymerizable monomer with a Hildebrand Solubility parameter less than 17.14 MPa.sup.1/2.

3. An organosol dispersion according to claim 1 wherein the steric stabilizer further comprises a polymerizable monomer selected from the group consisting of lauryl acrylate, lauryl methacrylate, n-octadecyl acrylate, and n-octadecyl methacrylate.

4. An organosol dispersion according to claim 1 wherein the steric stabilizer has a weight average molecular weight between 100,000 and 300,000 Daltons.

5. An organosol dispersion according to claim 1 wherein the ratio of the core to the stablizer on a weight to weight basis is between 1/1 and 15/1.

6. An organosol dispersion according to claim 1 wherein the ratio of the core to the stablizer on a weight to weight basis is between 2/1 and 10/1.

7. An organosol dispersion according to claim 1 wherein the ratio of the core to the stablizer on a weight to weight basis is between 4/1 and 8/1.

8. A liquid ink comprising: (a) a carrier liquid having a Kauri-Butanol number less than 30; (b) a graft copolymer comprising a (co)polymeric steric stabilizer covalently bonded to a thermoplastic (co)polymeric core that is insoluble in the carrier liquid; and (c) a colorant, wherein the steric stabilizer comprises units derived from 3,3,5-trimethylcyclohexyl methacrylate.

* * * * *